US006980582B2

(12) United States Patent
Cai

(10) Patent No.: US 6,980,582 B2
(45) Date of Patent: Dec. 27, 2005

(54) METHOD FOR ACHIEVING A LARGE CAPACITY OF SCDMA SPREAD COMMUNICATION SYSTEM

(75) Inventor: Zhaohui Cai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 374 days.

(21) Appl. No.: 10/445,219

(22) Filed: May 27, 2003

(65) Prior Publication Data

US 2003/0202562 A1 Oct. 30, 2003

Related U.S. Application Data

(63) Continuation of application No. PCT/CN01/00806, filed on May 18, 2001.

(51) Int. Cl.$^7$ ............................................. H04B 1/707
(52) U.S. Cl. .................................................... 375/141
(58) Field of Search ................................ 375/130, 140, 375/141, 144, 145, 146, 147, 343; 455/561, 455/562.1; 370/320, 335, 342, 441

(56) References Cited

U.S. PATENT DOCUMENTS

| 5,588,020 A | 12/1996 | Schilling |
| 6,556,634 B1 * | 4/2003 | Dent ........................... 375/343 |
| 2002/0172180 A1 * | 11/2002 | Hall et al. .................. 370/342 |
| 2004/0214604 A1 * | 10/2004 | Yoon et al ............... 455/562.1 |

FOREIGN PATENT DOCUMENTS

CN 1205584 A 1/1999

* cited by examiner

*Primary Examiner*—Don N. Vo
(74) *Attorney, Agent, or Firm*—Bacon & Thomas, PLLC

(57) ABSTRACT

The invention is an implementing method for one kind of large capacity spread-spectrum communication systems. The method is used for increasing system capacity and raising spectral efficiency of a synchronous code division multiple access spread-spectrum communication system. The method sets a transmitting antenna or receiving antenna of the transmitting end or receiving end to a smart antenna solely, or sets them to smart antennas simultaneously. The method uses a large spreading codes set with the codes number is greater than the code length for spreading unit in the transmitting end. The method also uses a large spreading codes set with the codes number is greater than the code length for demodulation processing unit in the receiving end, and uses joint detection and interference suppression techniques for this demodulation processing unit.

9 Claims, 3 Drawing Sheets

METHOD FOR ACHIEVING A LARGE CAPACITY OF SCDMA SPREAD COMMUNICATION SYSTEM

This application is a continuation of International Application PCT/CN01/00806, filed May 18, 2001, of which the entire disclosure of the pending, prior application is hereby incorporated by reference.

FIELD OF THE TECHNOLOGY

The present invention relates generally to a mobile communication technology, and more particularly to a method for implementing a wireless SCDMA (synchronous code division multiple access) spreading system with a large capacity, multiple subscribers and high spectral efficiency.

BACKGROUND OF THE INVENTION

Communication traffic is increased day by day, but the communication band is limited. For a limited band communication system, the capacity or the spectral efficiency is an important issue. Obviously, the spectral efficiency of present communication system, such as GSM (Globe System for Mobile Communication) and narrowband CDMA, is not satisfied.

The third generation (3G) mobile communication system being researched will greatly increase capacity and spectral efficiency, by using of some new technologies, such as smart antenna, multi-user detection and spread-spectrum etc. The 3G mobile communication system includes the IMT 2000 family, such as Wideband Code Division Multiple Access (WCDMA), Time Division—Synchronous Code Division Multiple Access (TD-SCDMA), CDMA 2000 etc.

The smart antenna uses techniques, such as spatial filtering and beam forming etc. Since space division concept is used, a subscriber is differentiated with other subscribers not only by "code", but also by "physical space". In this way, the multiple access interference (MAI) between different subscribers is greatly reduced. It is obvious that the smart antenna has advantage for increasing system performance and spectral efficiency and will have a bright application future. It is definite that the smart antenna will be used in the TD-SCDMA system. Besides, the smart antenna technique is considered to use in the 3G mobile communication system too.

Multiuser detection technique, including joint detection and interference suppression etc, is used in reception. Since the MAI is suppressed, so capacity of a system will be increased. At present, the technique has been used in many communication systems.

Core of the spread-spectrum technology is that data of every subscriber are modulated by spreading code with pseudo-random characteristics. For example, in a CDMA system subscribers are differentiated by different spread codes. The spreading code can use various pseudo-random sequences. Some communication systems even use combined spread code, i.e., combining two or more than two kinds of spread codes. For example, in IS95 and 3G families, a WALSH code including OVSF code and a scrambling code including Gold code, m sequences are combined as a spread code. OVSF code is an orthogonal variable spreading factor codes, its generation method can refer to the Chinese Wireless Telecommunication Standard (CWTS) TS C104 V3.0.0 Spreading and Modulation. In a 3G communication system, for a certain length of OVSF code, the number of spreading codes equals to the length of the spread code. For example, when the spreading code length is 16, the number of the spreading codes is also 16.

In general, a spread-spectrum communication system is a system with interference limited. The capacity of a spread-spectrum communication system is determined by the interference level within the system. In a spread-spectrum communication system, there are various kinds of interference, such as additive white Gaussian noise (AWGN), multipath interference and multiple access interference caused by multiple subscribers, etc. For a specific mobile communication system, when the number of subscribers is increased (capacity is increased), multiple access interference becomes the key to limit the increasing. This is because the multiple access interference is stronger along with the increasing of subscribers number and power.

In summary, the capacity of a spread-spectrum communication system is limited by interference of the system, the used bandwidth and the number of spread codes, etc. When the system uses smart antenna technique, the multiple access interference between subscribers will be reduced. When the system also uses multiuser detection at the same time, the multiple access interference will be further reduced, and the capacity and performance of system will be raised.

In general, a spread-spectrum communication system without using smart antenna and multiuser detection techniques cannot use all number of channels provided by the spread codes, i.e., the system real capacity cannot reach the design capacity. Usually, a spread-spectrum communication system that only uses smart antenna technique or multiuser detection technique alone cannot suppress multiple access interference perfectly. For example, a SCDMA system with an OVSF code of length 16 only uses zero-forcing joint detection algorithm, without using smart antenna technique, then the system performance is rapidly worse when system noise is increased. Therefore, in order to increase capacity of a spread-spectrum communication system, it is necessary to use smart antenna and multiuser detection techniques at the same time.

The TD-SCDMA system proposed by CWTS uses smart antenna and multiuser detection techniques at the same time, so the system capacity is greatly increased and the system performances are much better.

Nevertheless, although the present spread-spectrum communication system uses both techniques: smart antenna and multiuser detection, but the number of channels of the spreading codes set is not increased so that the advantage of smart antenna and multiuser detection can not be brought into play. This is another limitation of a system capacity. For example, in a TD-SCDMA system using OVSF codes, when the length of spreading code is 16, the simultaneous channels number (subscribers number) cannot excess 16.

SUMMARY OF THE INVENTION

The invention purpose is to design an achieving method for a SCDMA spread-spectrum communication system with a large capacity. The system uses various present techniques thoroughly for expanding a system capacity and for implementing a spread-spectrum communication system with large capacity and high spectral efficiency.

The technique scheme for implementing the invention purpose is as follow. At the transmitting end, it is configured with a source unit, a channel coding unit, a spreading unit, a radio frequency transmitting unit and a transmitting antenna. At the receiving end, it is configured with a receiving antenna, a radio frequency processing unit, a demodulation processing unit and a channel decoding unit.

It is characterized that the technique scheme will use a smart antenna for the transmitting antenna or the receiving antenna, solely, or use smart antennas for both the transmitting antenna and receiving antenna at the same time. It is also characterized that at the spreading unit of the transmitting end, a large spreading codes set with the codes number greater than the length of the spreading code is used; and at the demodulation processing unit of the receiving end, a large spreading codes set with the codes number greater than the length of the spreading code is used for baseband signal demodulation processing.

Said demodulation processing unit of the receiving end also uses joint detection and interference suppression techniques.

Said large spreading codes set is a set with M codes, wherein M is greater than the spreading code length N and the M and N are a positive integer. The large spreading codes set is obtained by searching $2^N$ non-orthogonal codes with a length of N.

Said large spreading codes set is a set with M codes, wherein M is greater than the spreading code length N and the M and N are a positive integer. The large spreading codes set is obtained by combining N OVSF codes with a length of N and L scrambling codes.

Said L is an integer equal to or greater than 2. The number of spreading codes of a codes set, i.e. M, is selected from a number that is less than K×N/2 according to the measured interference level of the system. Wherein K is array elements of said smart antenna and N is the length of the spread code.

Said codes set, obtained by combining the OVSF codes and scrambling codes, is first allocated the spreading codes that are combined with the same scrambling code.

Said spreading processing in transmitting end and demodulation processing in receiving end is that taking spread codes, having good correlation properties, from the large spreading codes set and allocating them to the subscribers which are in a same direction corresponding to the smart antennas in space.

Said spreading processing in transmitting end and demodulation processing in receiving end is that taking spreading codes which have not been used from the large spreading codes set and allocating them to new services or new subscribers for spreading processing and demodulation processing; and when the services are ended or the subscribers shut down, the spreading codes will be released.

The invention, an implementing method for large capacity SCDMA spread-spectrum communication system, combines the present smart antenna technology and multiuser detection technology; and based on this combination, a larger spreading codes set is used to obtain a spread-spectrum communication system with large capacity and high spectral efficiency.

Based on the invention method, a communication system can use potentialities of the smart antenna and multiuser detection technologies for increasing system capacity. For a certain length of spread codes, the number of spread codes, which use for spreading and demodulation processing, exceeds the number of spreading codes of a present spread-spectrum system. In this way, the channels number (subscribers number) simultaneously existing in a time-slot is increased without affecting the system performance (because of a multiple access interference of multiple subscribers).

EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
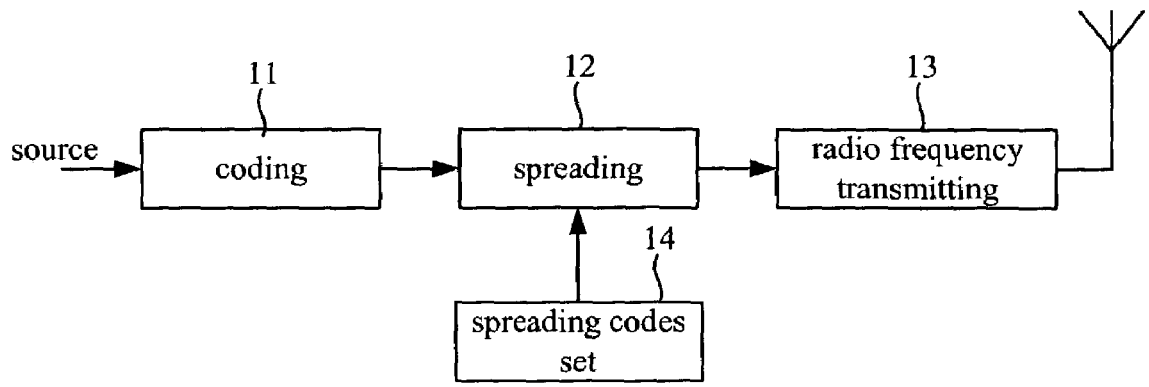
FIG. 1 shows a transmitting end diagram of the invention of a large capacity communication system based on a smart antenna.
Figure 2:
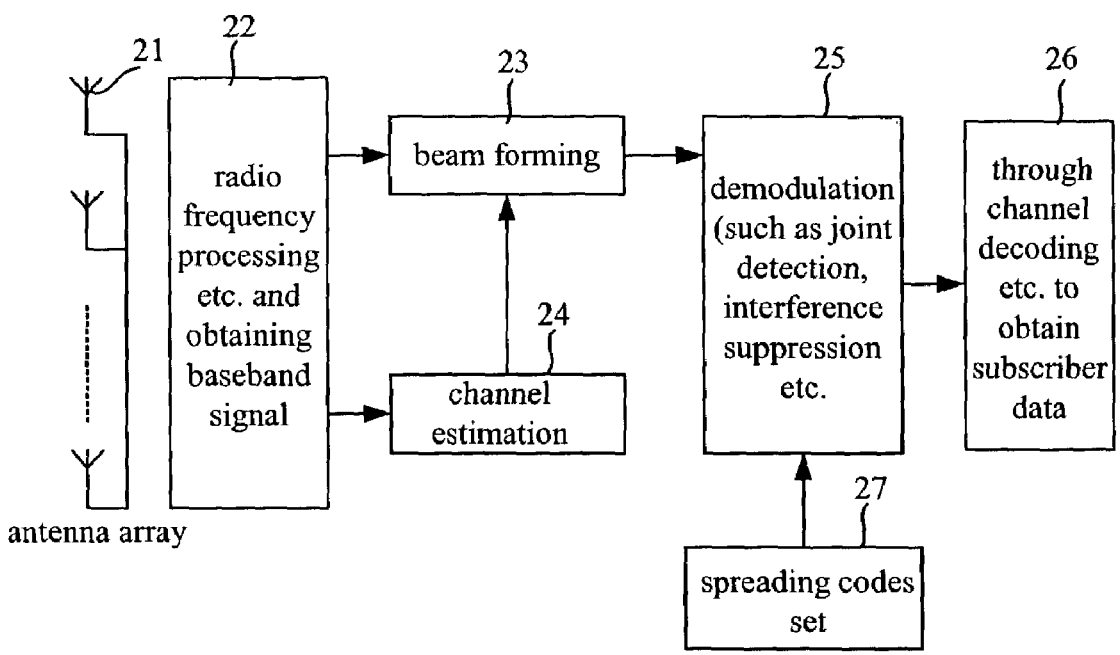
FIG. 2 shows a receiving end diagram of the invention of a large capacity communication system based on a smart antenna.

FIGS. 1 and 2 show the transmitting end and receiving end structure diagrams, respectively, of a large capacity communication system based on a smart antenna of the invention. The FIG. 1 transmitting end can be a mobile terminal in a cell of a cellular mobile communication system. The FIG. 2 receiving end can be a base station of a cellular mobile communication system.

The transmitting end, mainly, includes a baseband modulation unit and a radio frequency transmitting unit. A signal, such as a user voice, a data signal etc., is processed by the channel coding unit 11 and spread-spectrum unit 12, then a baseband modulated signal is obtained. The modulated signal is then passed the radio frequency transmitting unit 13 and is emitted to the air by the antenna. The spread-spectrum unit 12 modulates the coded signal with a spreading code selected from the spreading codes set 14. There are one or many such transmitting ends in a mobile communication system, which share a common spreading codes set 14.

The receiving end, mainly, includes a radio frequency unit and a baseband demodulation unit. A signal, received by the smart antenna array 21, is processed by the radio frequency unit 22, then a baseband signal is obtained. The baseband signal is processed by the beam forming 23 and the channel estimation 24, respectively. After that, it is further processed by the demodulation (de-spreading) unit 25 and channel decoding unit 26, and finally a user signal is recovered. During the processing, the demodulation (de-spreading) unit 25 also demodulates (de-spread) the coded signal with a spreading code selected from the spreading codes set 27. In the demodulating (de-spreading) processing, the demodulation (de-spreading) unit 25 can determine whether using a multiuser detection, including joint detection, interference suppression etc., according to the system requirement and the interference condition.

In the base station side, the smart antenna technology is used. For uplink receiving, channel estimation of every subscriber on the antenna array element is obtained by its pilot data in the channel estimation unit 24. With these channel estimation values, a beam forming matrix of the smart antenna is obtained. With this matrix, beam forming of every subscriber signal is made in the beam forming unit 23, then every subscriber data are processed by the multiuser detection and are demodulated at the demodulation (de-spreading) unit 25.

In FIGS. 1 and 2, only one uplink is described, but in real, a communication link should include uplink and downlink duplex links. The two links can use CDMA, TDMA/CDMA, or FDMA/CDMA. Besides, in FIGS. 1 and 2, the smart antenna is only shown at the receiving end. In real, the transmitting end can also use a smart antenna and transmitting signal of every subscriber also can be made beam forming at the downlink.

The main difference of the invention system from present system is that a large spreading codes set is used. Suppose the length of the spreading code is N, for a spread-spectrum system using OVSF+single scrambling code, in generally, the number of codes of the codes set is N. It means that the system channel number in a same timeslot and in a same cell is N. Therefore, in the invention system, the number of a real code set should be greater than N. For example, when the length of a spreading code is 16, the number of spreading codes of the real codes set for a convention spread-spectrum system is 16. However, for the invention system, the number of the spreading codes in the real large codes set should be greater than 16.

The large spreading codes set can be generated by two methods. One method uses a non-orthogonal code of the non-OVSF code. For a dualistic code, when the length of a spreading code is N, the number of spreading codes is $2^N$. Therefore, using the original searching method, or Gold code or other pseudorandom code, or its shortened sequence, a set with M spreading codes can be obtained, wherein M is greater than N. The set with M spreading codes can be used as the large spreading codes set. Another method still uses an OVSF code, but using L different scrambling codes in a cell (sector), wherein L is equal to or greater than 2. In this way, within a cell, the possible spreading codes of a set to be used are more than N. For example, for a OVSF code, if the code number can be simultaneously used is N (N is the code length), when using L scrambling codes for a cell, then L×N combined codes can be obtained. A combined code is obtained by multiplying directly the corresponding bit of the OVSF code and the scrambling code. For example, if the OVSF code is a=(a1, a2, a3 ... aN) and the scrambling code is s=(s1, s2, s3 ... sN), then the combined code is c=(c1, c2, c3 ... cN)=(a1s1, a2s2, a3s3 ... aNsN).

The M value or L value should be taken is determined by system interference condition. When the array element number of a smart antenna is many, the L value and M value can take a larger one to increase system capacity. When various factors, such as the number of antenna elements, the cell environment, the neighbor cell situation and the service requirement etc., are considered, the number M of a large codes set of the spreading code with length N should be less than K×N/2, wherein K is the antenna elements number. In practice, first measure the system interference, then the available spreading codes number in the large codes set is determined by the interference.

In the invention system, along with the channels number is increased, the multiple access interference will be stronger, which is a negative influence. In order to reduce this influence, the spreading codes with better correlation properties (i.e., with less correlation value) can be allocated to the subscribers that are at a same direction (or in a nearer direction) corresponding to the smart antennas in space. When a system starts operation or when the system services are increased, an unused spreading code from the large spreading codes set, are allocated to the new subscriber or new service for spreading or de-spreading (demodulating). After the subscriber shut down or the service has been ended, the spreading code is released. When using the system, allocation of codes of the large code set should be based on the system service situation. For a system combining OVSF code and scrambling code, the codes generated by a same scrambling code will be allocated first, and by measuring the system interference, it is determined that whether the further codes can be allocated.

A system of the invention fully utilizes various technologies potential to increase system capacity. When comparing the invention system with the present mobile communication system, taking the smart antenna and multiuser detection technologies, such as TD-SCDMA system, it is seen that the later is limited by the number of OVSF codes with a certain length, and the channels number (the subscribers number) is also limited. Therefore, the system capacity is limited. Especially when there are more array elements of a smart antenna, the performance of the smart antenna is not fully utilized. Nevertheless, a system of the invention can fully utilize various technologies potential, so the whole system capacity is increased greatly and the spectral efficiency is increased too.

A system of the invention uses the smart antenna technology and takes the space division concept, so the multiple access interference is reduced in a certain degree. This will reduce requirement of orthogonality and correlation, so the number of a spreading code with a certain code length is greater than that of the system without using a smart antenna. Further, when using multiuser detection technology, the multiple access interference is further overcome and the number of code channels is expanded.

The technical scheme of the invention is as follow. Using a smart antenna should be the essential point for the technical scheme. When the code length of a spreading code is N, more than N spreading codes are used, and perhaps a multiuser detection technology is also used at the same time. The most important method for generating spreading codes is that in a cell (a sector), the spreading code uses OVSF code and multiple different scrambling codes to obtain an expanded spreading codes set. When allocating the spread codes, it is based on the correlation property of the spreading codes and is allocated in the space.

In a TD-SCDMA system proposed by CWTS, in a cell (a sector), when only a 16 bits length OVSF code and a scrambling code are used, then in the cell (a sector) only 16 code channels (subscribers) can exist simultaneously. A system of the invention based on the mentioned TD-SCDMA system takes a larger spreading codes set, by using 16 bits OVSF code and two different scrambling codes in a cell, and can have 32 code channels simultaneously (reference to FIG. 5 for performance comparison).

Figure 3:
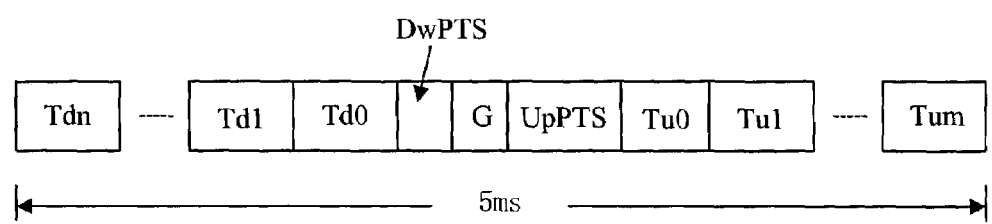
FIG. 3 shows a sub-frame structure diagram of a TD-SCDMA system.

A TD-SCDMA system uses a 720 ms superframe. Each superframe consists of 72 frames with 10 ms long, and each frame is divided into two 5 ms subframe as shown in FIG. 3.

Each 5 ms subframe is divided into seven standard time-slots with a 0.675 ms long (hereinafter, without special description, a time-slot is the standard time-slot with a 0.675 ms long) Td0, Td1 ... Tdn, Tu0, Tu1 ... Tum and three special time-slot: DwPTS (downlink pilot time slot), G (guard period for receiving and transmitting transformation) and UpPTS (uplink pilot time slot). In these seven standard time-slots, except one downlink time-slot and one uplink time-slot, other five time-slots can be dynamically allocated between services according to requirement. Every time-slot (including special time-slot) can be divided into multiple code channels through spread-spectrum mode. Since a TD-SCDMA system uses a TDD (Time Division Duplex) mode and a mixed mode with TDMA and CDMA, so the system can conveniently transfer symmetric service and non-symmetric service, and flexibly allocates time-slots amount for uplink and downlink.

Figure 4:
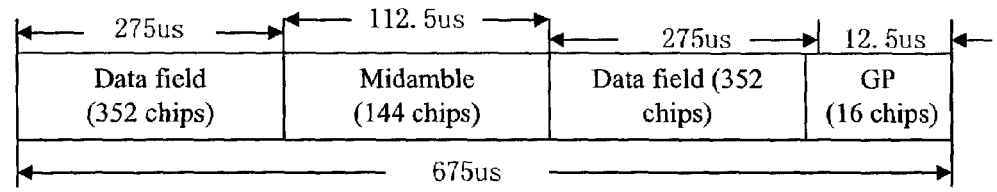
FIG. 4 shows a burst structure diagram of a TD-SCDMA system.

As shown in FIG. 4, in a TD-SCDMA system, a variable speed transfer can be done, through different spreading gain when spread-spectrum within a time-slot, multiple channels and multiple time-slots. Each time-slot structure or burst structure of the system are shown in FIG. 4. Each standard time-slot with 0.675 ms long includes two data field with a length of 275 $\mu$s (352 chips), one midamble field with a length of 112.5 $\mu$s (144 chips) and one guard period field with a length of 12.5 $\mu$s (16 chips). Each burst structure is a length of 864 chips and the data field is 704 chips.

According to different transmission rate, a subscriber can apply for multiple channels, multiple time-slots or both. For spreading in a time-slot, two modes can be used. One uses fixed spreading factor and a subscriber can apply for multiple channels for transmission simultaneously, i.e., a multiple channel transmission mode. Another uses varied spreading factor, i.e., a variable spreading factor transmission mode.

For a TD-SCDMA system, the spreading scheme uses an OVSF code and an scrambling code with a length of 16. The original TD-SCDMA system provides totally 128 scrambling codes.

For a TD-SCDMA system, the receiving end and the transmitting end can use a smart antenna with 4 to 16 array elements.

An embodiment of the invention uses the same smart antenna technique, the same time-slot structure, the same frame (subframe) structure and a similar spreading mode as the TD-SCDMA system, mentioned above.

Similarly, a spread-spectrum mode with an OVSF code and an scrambling code is used, but in a cell, two or more than two scrambling codes are used and different code channels are differentiated by different scrambling codes and OVSF codes together.

Similar to the TD-SCDMA system, a system of the invention uses dynamic channel allocation policy to reduce multiple access interference in a system.

Figure 5:
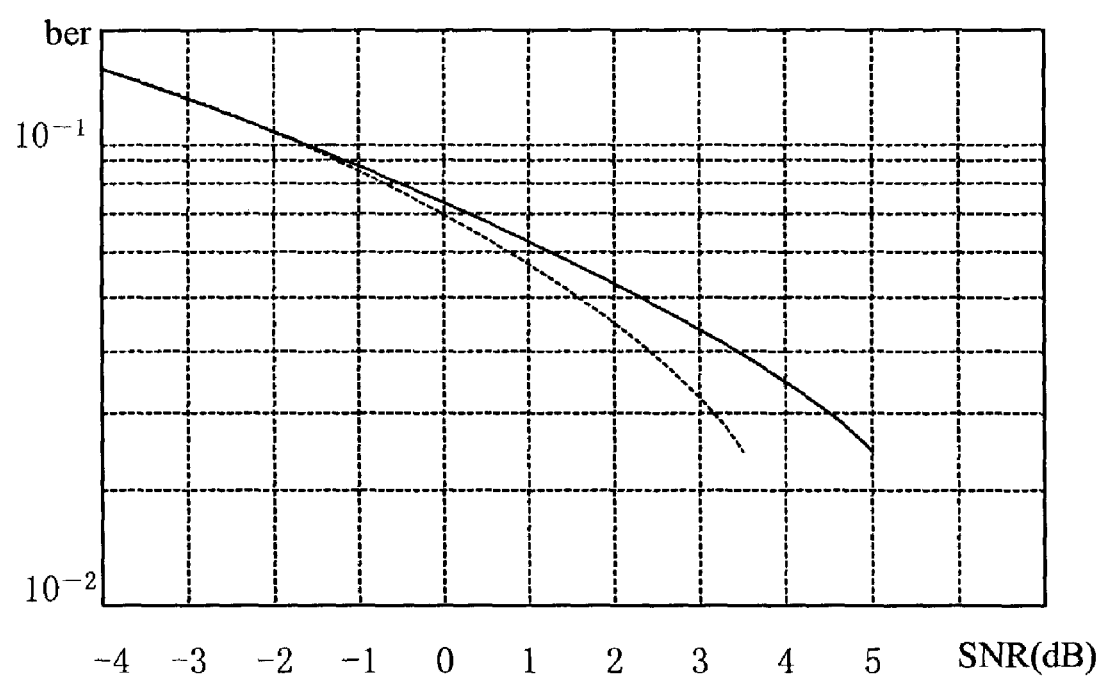
FIG. 5 shows a performance comparison diagram of the invention system with 32 channels and a convention system with 16 channels.

FIG. 5 shows a verified result of the emulation. The emulation for a TD-SCDMA system is made according to the CWTS TS C101 (V3.0.0) to TS C105 (V3.0.0). The emulation link is an uplink, wherein the smart antenna is a ring antenna array with eight array elements. For a emulation of 16 code channels, the $0^{th}$ scrambling code is used, and for a emulation of 32 code channels, the $0^{th}$ and $4^{th}$ scrambling codes are used. A MMSE (Minimum Mean Square Error) joint detection technique and a QPSK (Quadrature Phase-Shift-Keying) modulation technique are also used. The channel model uses ITU-R M.1225 Vehicular test environment Channel A, and the car speed is set in 120 kilometer per hour. In FIG. 5, the x-coordinate represents signal-to-noise ratio (SNR with unit dB) and the y-coordinate represents bit-error ratio (BER). The emulation result shows that: when the SNR is within the system working range, the system performance of 32 code channels (represented by the real line) and 16 code channels (represented by the dotted line) is almost the same, but the total capacity of the system of 32 code channels is two times more than the total capacity of the system of 16 code channels.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An achieving method for a large capacity Synchronous Code Division Multiple Access (SCDMA) spread-spectrum communication system, comprising:
    configuring a source unit, a channel coding unit, a spreading unit, a radio frequency transmitting unit and a transmitting antenna in transmitting end;
    configuring a receiving antenna, a radio frequency processing unit, a demodulation processing unit and a channel decoding unit in receiving end;
    at least setting the transmitting antenna in the transmitting end or receiving antenna in the receiving end being a smart antenna;
    setting a large spreading codes set, with the number of codes greater than length of a code in the set, being used for spread-spectrum processing in the spreading unit of transmitting end;
    setting a large spread codes set, with the number of codes greater than length of the code in the set, being used for demodulation processing for baseband signal in the demodulation processing unit of receiving end.

2. The method according to claim 1, further using joint detection and interference suppression techniques in the demodulation-processing unit of the receiving end.

3. The method according to claim 1, further setting transmitting antenna of the transmitting end being a smart antenna, or setting receiving antenna of the receiving end being a smart antenna, or setting simultaneously transmitting antenna of the transmitting end and receiving antenna of receiving end being smart antennas.

4. The method according to claim 1, wherein the large spreading codes set with M codes is obtained by searching in $2^N$ non-orthogonal codes with a length of N, M being greater than N, M and N being an integer.

5. The method according to claim 1, wherein the large spreading codes set with M codes is obtained by combining N orthogonal variable spreading factor (OVSF) codes with a length of N and L scrambling codes, wherein M being greater than N, and M and N being a positive integer.

6. The method according to claim 5, the L is a positive integer equal to or greater than 2, a really used spreading codes number M is selected from numbers less than K×N/2, according to a measured system interference level, wherein K being array elements number of said smart antenna and N being code length of said spread codes.

7. The method according to claim 5, further comprising: first allocating spreading codes combined by a same scrambling code, which is from a spreading codes set obtained by combining OVSF codes and scrambling codes.

8. The method according to claim 1, further comprising: allocating spreading codes with good correlation properties of the large spreading codes set to subscribers which are at a same direction corresponding to the smart antennas in space in the spreading processing of transmitting end and demodulation processing of receiving end.

9. The method according to claim 1, further comprising: allocating an unused spreading code in the spreading codes set to a new service or a new subscriber for spreading processing and demodulation processing; and releasing allocated spreading code if service is ended or the subscriber shut down in the spreading processing of transmitting end and demodulation processing of receiving end.

* * * * *